(12) United States Patent
Ja Chisholm et al.

(10) Patent No.: US 6,844,950 B2
(45) Date of Patent: Jan. 18, 2005

(54) MICROSTRUCTURE-BEARING ARTICLES OF HIGH REFRACTIVE INDEX

(75) Inventors: Bret Ja Chisholm, Clifton Park, NY (US); Dennis Joseph Coyle, Clifton Park, NY (US); James Alan Resue, Scotia, NY (US)

(73) Assignee: General Electric Company, Niskayuna, NY (US)

( * ) Notice: Subject to any disclaimer, the term of this patent is extended or adjusted under 35 U.S.C. 154(b) by 68 days.

(21) Appl. No.: 10/336,877

(22) Filed: Jan. 7, 2003

(65) Prior Publication Data

US 2004/0132858 A1 Jul. 8, 2004

(51) Int. Cl.[7] .............................. G02B 1/04; G02B 3/08; G02B 5/00; C09K 19/00; C08K 3/10
(52) U.S. Cl. .................... 359/49; 359/456; 359/457; 359/459; 359/580; 359/742; 428/1.1; 428/1.6; 428/30; 428/64.4; 428/195; 428/206; 522/81; 522/83; 522/77
(58) Field of Search .................... 428/195, 206, 428/64.4, 1.1–1.62, 141, 156, 167, 409; 359/742, 49, 456, 457, 459, 580–582, 599, 837; 522/81, 83, 173, 175, 96, 97

(56) References Cited

U.S. PATENT DOCUMENTS

| | | | | |
|---|---|---|---|---|
| 4,576,850 A | * | 3/1986 | Martens | ...................... 428/156 |
| 5,175,030 A | * | 12/1992 | Lu et al. | ........................ 428/30 |
| 6,247,986 B1 | * | 6/2001 | Chiu et al. | ..................... 445/24 |
| 6,291,070 B1 | | 9/2001 | Arpac et al. | |
| 6,432,526 B1 | | 8/2002 | Arney et al. | |
| 6,467,897 B1 | * | 10/2002 | Wu et al. | .................... 347/102 |
| 6,599,631 B2 | * | 7/2003 | Kambe et al. | .............. 428/447 |

OTHER PUBLICATIONS

P.W. Oliveira et al, "Fabrication of GRIN–Materials by Photopolymerization of Diffusion–Controlled Organic–Inorganic Nanocomposite Materials", Materials Research Society Symp. Proc. vol. 435, 1996.*

* cited by examiner

Primary Examiner—Susan Berman
(74) Attorney, Agent, or Firm—Andrew J. Caruso; Patrick K. Patnode

(57) ABSTRACT

Blends of oligomeric urethane multi(meth)acrylate; optionally at least one other monomer selected from the group consisting of acrylic monomers, styrenic monomers and ethylenically unsaturated nitrogen heterocycles, preferably a polyol multi(meth)acrylate; and nanoparticles of an ethylenically unsaturated, preferably (meth)acrylic-functionalized, titanium or zirconium compound can be cured by ultraviolet radiation in contact with a photoinitiator to produce optical resinous articles having high refractive indices, haze ratings of at most 5% and other properties which may be tailored according to the desired use.

25 Claims, 1 Drawing Sheet

MICROSTRUCTURE-BEARING ARTICLES OF HIGH REFRACTIVE INDEX

BACKGROUND OF THE INVENTION

This invention relates to the replication of microstructure-bearing surfaces, and more particularly to a genus of resin-based compositions capable of such replication.

Microstructure replication in resinous surfaces is of importance in such diverse technical fields as the fabrication of traffic signs, in which reflectivity is provided by cube-corner embossed sheeting; the production of Fresnel ophthalmic lens elements and flexible video disks; and the fabrication of "brightness enhancement" or "light management" films (hereinafter sometimes designated "LMF" for brevity) for liquid crystal displays. For replication purposes, it is desirable that the resin have optimum physical properties, including substantial transparency, a glass transition temperature (Tg) high enough for shape retention during storage and use and viscoelastic properties facilitating shaping, typically by molding, and long-term shape retention which includes the microstructure aspects of the shaped articles. Suitable viscoelastic properties include moduli in the glassy and rubbery states within certain ranges, as well as suitable transition temperatures between those states. It is also desirable for the LMF to be adherent to substrates such as polycarbonate and to have good resistance to abrasion and scratching.

Many suitable resinous compositions for the replication of microstructure are disclosed in the patent literature. A patent whose disclosure is generic to a large variety of such compositions is U.S. Pat. No. 4,576,850. The compositions described therein are characterized by "hard" and "soft" segments or moieties in combination with radiation-polymerizable moieties. Most often, all three of these types of segments are present in the same molecule. A key feature of the "hard" segments is the presence therein of cyclic (i.e., carbocyclic or heterocyclic) groups. Later-issued patents frequently make reference to U.S. Pat. No. 4,576,850 for its disclosure of suitable polymeric compositions and precursors therefor.

Optimally, an LMF will have a high refractive index, preferably at least about 1.70. Attainment of a refractive index this high is, for the most part, not possible when using only resinous materials of reasonable cost. The refractive indices of polymers of highly brominated monomers such as pentabromophenyl methacrylate are about 1.71, but such polymers sometimes have unfavorable physical properties.

U.S. Pat. No. 6,291,070 discloses highly transparent nanostructured molded articles having a wide range of refractive indices, prepared from such inorganic materials as titanium dioxide combined with polymerizable or polycondensable surface groups such as those derived from (meth)acrylic and epoxy compounds. There may also be present other monomeric species such as (meth)acrylic acid esters.

U.S. Pat. No. 6,432,526 discloses compositions of high refractive index comprising highly crystalline metallic particles such as those of titanium dioxide, combined with an organic solvent and a dispersing aid to form colloidal particles. Such particles may be combined with organic polymers such as those derived from acrylates and methacrylates to form said compositions.

It is of interest, however, to develop additional high refractive index resinous LMF materials not disclosed in the above-identified patents or in other publications. In particular, it is of interest to provide a means for easily tailoring such materials to various property profiles.

SUMMARY OF THE INVENTION

The present invention is directed to mixed organic-inorganic compositions which are curable by radiation to optical articles having high refractive indices. Said compositions may be employed to form articles with replicated microstructures. The proportions of constituents therein may be varied to provide a wide assortment of property profiles.

In one of its aspects, the invention includes articles which are radiation curable to optical resinous articles having surfaces with a replicated microstructure comprising a plurality of utilitarian discontinuities having an optical purpose, said article being curable to a cured article having a haze rating corresponding to a value, as determined by ASTM procedure D1003 on a flat film 3.2 mm thick on a bisphenol A polycarbonate substrate, of up to 5% and comprising:

(A) at least one oligomeric urethane multi(meth)acrylate, optionally in combination with at least one other monomer effective to reduce viscosity, improve thermomechanical properties or increase refractive index;

(B) nanoparticles of at least one ethylenically unsaturated metal compound selected from the group consisting of tetravalent titanium and tetravalent zirconium compounds; and (C) at least one photoinitiator.

Another aspect of the invention is optical resinous articles prepared by radiation curing of the above-described curable articles.

BRIEF DESCRIPTION OF THE DRAWING

The drawing is a schematic view of a LMF in a backlit liquid crystal display.

DETAILED DESCRIPTION; PREFERRED EMBODIMENTS

Figure 1:
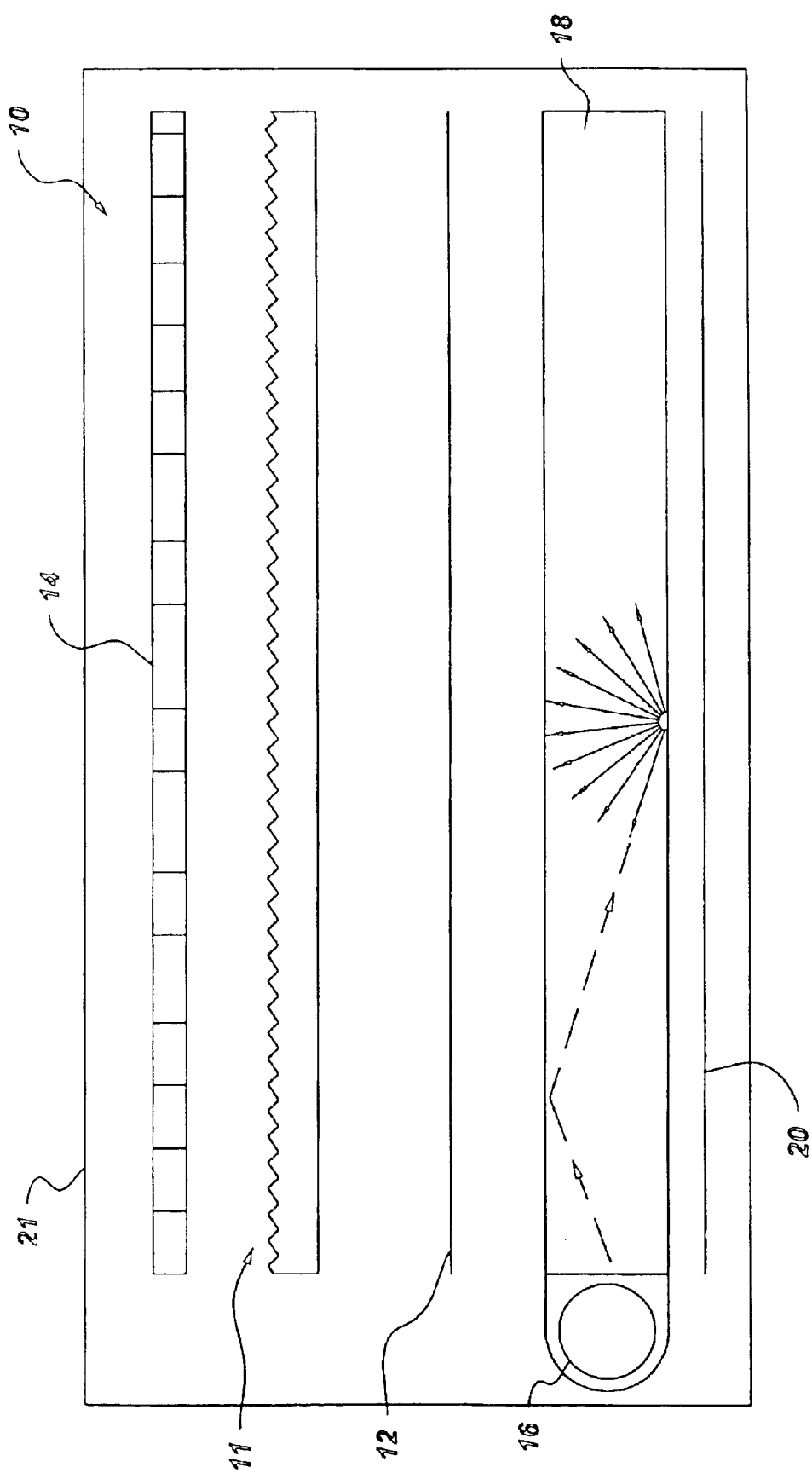

The optical resinous articles of the present invention are characterized by a surface with replicated microstructure comprising a plurality of utilitarian discontinuities, such as projections and depressions, which surface may be readily released from a mold after radiation curing without loss of the detail of the mold and with retention of the replication of such detail under a wide variety of conditions during use. The articles have a wide variety of desired properties, such as toughness, flexibility, optical clarity and homogeneity, and resistance to common solvents. The microstructures of such articles have high thermal dimensional stability, resistance to abrasion and impact, and integrity even when the articles are bent to an angle as great as 180°.

The term "microstructure" is used herein as defined and explained in U.S. Pat. No. 4,576,850, the disclosure of which is incorporated by reference herein. Thus, it means the configuration of a surface which depicts or characterizes the predetermined desired utilitarian purpose or function of the article having the microstructure. Discontinuities such as projections and indentations in the surface of said article will deviate in profile from the average center line drawn through the microstructure such that the sum of the areas embraced by the surface profile above the center line is equal to the sum of the areas below the line, said line being essentially parallel to the nominal surface (bearing the microstructure) of the article. The heights of said deviations will typically be about ±0.005 to ±750 microns, as measured by an optical or electron microscope, through a representative characteristic length of the surface, e.g., 1–30 cm. Said average center line can be piano, concave, convex, aspheric or combinations thereof. Articles where said deviations are of low order, e.g., from ±0.005 to ±0.1 or, preferably, to ±0.05 microns, and said deviations are of infrequent or minimal occurrence, i.e., the surface is free of any significant discontinuities, are those where the microstructure-bearing surface is an essentially "flat" or "smooth" surface, such articles being useful, for example, as precision optical elements or elements with a precision optical interface, such as ophthalmic lenses. Articles where said deviations are of low order and of frequent occurrence include those having anti-reflective microstructure. Articles where said deviations are of high-order, e.g., from ±0.1 to ±750 microns, and attributable to microstructure comprising a plurality of utilitarian discontinuities which are the same or different and spaced apart or contiguous in a random or ordered manner, are articles such as retroreflective cube-corner sheeting, linear Fresnel lenses, video discs and LMF's. The microstructure-bearing surface can contain utilitarian discontinuities of both said low and high orders. The microstructure-bearing surface may contain extraneous or non-utilitarian discontinuities so long as the amounts or types thereof do not significantly interfere with or adversely affect the predetermined desired utilities of said articles. It may be necessary or desirable to select a particular oligomeric composition whose shrinkage upon curing does not result in such interfering extraneous discontinuities, e.g., a composition which shrinks only 2–6%.

Details of LMF construction and configuration are provided, for example, in U.S. Pat. No. 5,900,287, the disclosure of which is also incorporated by reference herein. Referring to the drawing, a backlit liquid crystal display generally indicated at 10 includes a LMF 11 which is typically positioned between a diffuser 12 and a liquid crystal display panel 14. The backlit liquid crystal display also includes a light source 16 such as a fluorescent lamp, a light guide 18 for transporting light for reflection toward the liquid crystal display panel 14, and a white reflector 20 for reflecting light also toward the liquid crystal display panel. The LMF 11 collimates light emitted from the light guide 18 thereby increasing the brightness of the liquid crystal display panel 14, enabling a sharper image to be produced by the liquid crystal display panel and allowing the power of the light source 16 to be reduced to produce a selected brightness. The LMF 11 in the backlit liquid crystal display is useful in equipment such as computers, personal televisions, video recorders, mobile communication devices, and automobile and avionic instrument displays.

Component A of the articles of this invention is at least one oligomeric urethane multi(meth)acrylate. The term "(meth)acrylate" is used to designate esters of acrylic and methacrylic acids, and "multi(meth)acrylate" designates a molecule containing more than one (meth)acrylic group, as opposed to "poly(meth)acrylate" which commonly designates (meth)acrylate polymers. Most often, the multi(meth) acrylate is a di(meth)acrylate, but it is also contemplated to employ tri(meth)acrylates, tetra(meth)acrylates and so on.

Oligomeric urethane multi(meth)acrylates may be obtained commercially; e.g., from Sartomer Co. They may also be prepared by the initial reaction of an alkylene diisocyanate of the formula OCN—$R^3$—NCO with a polyol. Most often, the polyol is a diol of the formula HO—$R^4$—OH, wherein $R^3$ is a $C_{2-100}$ alkylene or an arylene group and $R^4$ is a $C^{2-100}$ alkylene group. The intermediate product is then a urethane diol diisocyanate, which subsequently can undergo reaction with a hydroxyalkyl (meth)acrylate. Suitable diisocyanates include 2,2,4-trimethylhexylene diisocyanate and toluene diisocyanate; alkylene diisocyanates are generally preferred. A particularly preferred compound of this type may be prepared from 2,2,4-trimethylhexylene diisocyanate, poly(caprolactone)diol and 2-hydroxyethyl methacrylate.

The radiation curable compositions forming the articles of the invention may also comprise at least one other monomer effective to reduce viscosity, improve thermomechanical properties or increase refractive index. Monomers having these properties include acrylic monomers (i.e., acrylate and methacrylate esters, acrylamides and methacrylamides), styrenic monomers and ethylenically unsaturated nitrogen heterocycles.

Suitable acrylic monomers include monomeric (meth) acrylate esters. They include alkyl (meth)acrylates such as methyl acrylate, ethyl acrylate, 1-propyl acrylate, methyl methacrylate and t-butyl acrylate.

Also included are (meth)acrylate esters having other functionality. Compounds of this type are illustrated by the 2-(N-butylcarbamyl)ethyl (meth)acrylates, 2,4-dichlorophenyl acrylate, 2,4,6-tribromophenyl acrylate, t-butylphenyl acrylate, phenyl acrylate, phenyl thioacrylate, phenylthioethyl acrylate, alkoxylated phenyl acrylate, isobornyl acrylate and phenoxyethyl acrylate.

The other monomer may also be a monomeric N-substituted or N,N-disubstituted (meth)acrylamide, especially an acrylamide. These include N-alkylacrylamides and N,N-dialkylacrylamides, especially those containing $C_{1-4}$ alkyl groups. Examples are N-isopropylacrylamide, N-t-butylacrylamide, N,N-dimethylacrylamide and N,N-diethylacrylamide.

The other monomer may further be a polyol multi(meth) acrylate. Such compounds are typically prepared from aliphatic diols, triols and/or tetraols containing 2–10 carbon atoms. Examples of suitable poly(meth)acrylates are ethylene glycol diacrylate, 1,6-hexanediol diacrylate, 2-ethyl-2-hydroxymethyl-1,3-propanediol triacrylate (trimethylolpropane triacrylate), di(trimethylolpropane) tetraacrylate, pentaerythritol tetraacrylate, the corresponding methacrylates and the (meth)acrylates of alkoxylated (usually ethoxylated) derivatives of said polyols.

Styrenic compounds suitable for use as the other monomer include styrene, dichlorostyrene, 2,4,6-trichlorostyrene, 2,4,6-tribromostyrene, 4-methylstyrene and 4-phenoxystyrene. Ethylenically unsaturated nitrogen heterocycles include N-vinylpyrrolidone and vinylpyridine.

Component B is at least one ethylenically unsaturated metal compound selected from the group consisting of tetravalent titanium and tetravalent zirconium compounds, with titanium compounds generally being preferred by reason of their reasonable cost and particular suitability. By reason of the unsaturated functionalization therein, it is possible to incorporate the metal compound into the polymer formed upon radiation curing.

In fabricating the articles of the invention, it is important to minimize light scattering. Therefore, component B is in the form of nanoparticles. By "nanoparticles" is meant particles having a mean diameter up to 200 nm. Preferably, the particle diameter is up to 100 nm, more preferably up to 70 nm and most preferably in the range of about 5–50 nm. Particles of this size may be prepared by art-recognized techniques including flame pyrolysis, plasma processes, condensation processes in the gas phase, colloid techniques, precipitation processes, sol-gel processes, controlled nucleation and growth processes, MOCVD processes and (micro) emulsion processes. Particularly suitable in many instances are sol-gel processes starting with corresponding alkoxides (i.e., titanium or zirconium tetraalkoxides).

Functionalization of the metal-containing nanoparticles may be effected simultaneously with or following their formation, by contact of the alkoxide or the particles produced therefrom with an ethylenically unsaturated compound, typically an unsaturated trialkoxysilane. Most often, said compound is a (meth)acrylic compound which is often preferably a (meth)acryloxyalkyltrialkoxysilane such as 3-methacryloxypropyltrimethoxysilane (hereinafter sometimes "MPTMS"). It is frequently preferred for MPTMS functionalization to be conducted in the presence of a free radical scavenger, such as a stable free radical as exemplified by 4-hydroxy-2,2,6,6-tetramethylpiperidinyloxy (hereinafter sometimes "4-OH TEMPO"). It is believed that such functionalization affects primarily the surfaces of the nanoparticles, although the invention is not dependent on any theory of operation.

For the purpose of such functionalization, a molar ratio of titanium and/or zirconium to (meth)acrylic compound in the range of about 5–10:1 is normally employed. The proportion of free radical compound is a catalytic proportion, effective to promote the reaction. The reaction temperature is typically in the range of about 30–80° C. A solvent such as an alkanol may also be present, provided it is removed by vacuum stripping or the like prior to formation of the curable article. It is often convenient to formulate the nanoparticles as a sol in a suitable suspending agent such as propylene glycol methyl ether acetate.

Component C of the radiation curable articles of this invention is at least one photoinitiator effective to promote polymerization of said articles upon exposure to ultraviolet radiation. Suitable materials for use as photoinitiators are identified in the aforementioned U.S. Pat. No. 4,576,850 and in such reference works as *Encyclopedia of Polymer Technology*. Examples are benzoin ethers, hydroxy- and alkoxyalkyl phenyl ketones, thioalkylphenyl morpholinoalkyl ketones and acylphosphine oxides. Particularly useful in many instances is a commercially available material designated "Darocur 4265", comprising a mixture of 2-hydroxy-2-propyl phenyl ketone and (2,4,6-trimethylbenzoyl) diphenylphosphine oxide.

Constituent proportions in the radiation curable articles of the invention are subject to wide variation. In general, component A can comprise about 30–100% oligomeric urethane multi(meth)acrylate, with any balance being the other (meth)acrylate monomer. Component B most often comprises about 5–90% of total components A and B; all percentages are by weight. Component C, the photoinitiator, is present in a minor amount effective to promote polymerization upon exposure to ultraviolet radiation, generally in the range of about 0.005–3.0% and preferably about 0.005–1.0% based on total polymerizable components.

An important property of the cured articles of the invention is a haze rating corresponding to a value no greater than 5%, as determined by ASTM procedure D1003 on a flat film 3.2 mm thick on a bisphenol A polycarbonate substrate. Other preferred properties are an abrasion rating no greater than 20, preferably no greater than 10, as determined by the falling sand abrasion test (ASTM procedure D968), and an adhesion rating to bisphenol A polycarbonate of 5B as determined by the crosshatch adhesion test (ASTM procedure D3359).

The radiation curable articles of this invention may be prepared by simply blending the components thereof, with efficient mixing to produce a homogeneous mixture, and then removing any solvent employed in preparation of said components. It is often preferred to remove air bubbles by application of vacuum or the like, with gentle heating if the mixture is viscous, and casting or otherwise creating a film of the resulting blend on a desired surface. The film can then be charged to a mold bearing the microstructure to be replicated and polymerized by exposure to ultraviolet radiation, producing cured optical resinous articles of the invention having the aforementioned properties. If polymerized on a surface other than the one on which it is to be used, the optical resinous article can be transferred to another surface.

Such a polymerization process lends itself to rapid, mass production of articles with no adverse environmental impact because no or only a minor amount of solvent or other volatiles are evolved and the polymerization can be carried out at ambient temperatures and pressures. The process also lends itself to replication of articles with microstructure comprising utilitarian discontinuities, such as projections and depressions, which are readily released from the mold without loss of the detail of the mold and with retention of the replication of such detail under a wide variety of conditions during use. The articles can be formed with a wide variety of desired properties, such as toughness, flexibility, optical clarity and homogeneity, and resistance to common solvents, the microstructure of such articles having high thermal dimensional stability, resistance to abrasion and impact, and integrity even when the articles are bent.

The invention is illustrated by the following examples. All parts and percentages are by weight unless otherwise indicated. Percentages of monomeric constituents, including component B, and of photoinitiator are based on total monomeric constituents.

EXAMPLE 1

To a 3-necked flask equipped with an addition funnel, temperature probe and mechanical stirrer was charged 31.2 ml of 2,2,4-trimethylhexane 1,6-diisocyanate and 50 mg of dibutyltin dilaurate. The addition funnel was charged with 39.75 g of warm polycaprolactone diol (Mn. 530), which was added to the contents of the flask at 55–60° C. The mixture was then stirred at 65° C. for 14 hours. The flask was then cooled to 55° C. and a mixture of 18.7 ml of 2-hydroxyethyl methacrylate and 100 mg hydroquinone monomethyl ether was added while maintaining the temperature in the range of 54–58° C. The mixture was stirred at 55° C. for 10–12 hours until completion of the reaction was verified by infrared spectroscopy. The product was the desired oligomeric urethane dimethacrylate, hereinafter sometimes designated "oligomer dimethacrylate".

EXAMPLE 2

Titanium tetraisopropoxide, 105 g, was added with stirring to a mixture of 1,000 g of 2-propanol, 49.05 g of concentrated hydrochloric acid and 5.25 g. of distilled water. The resulting mixture was stirred at room temperature for 72 hours, after which 0.23 g of a 33% solution of 4-OH TEMPO in 1-methoxy-2-propanol and 13.75 g of 3-methacryloxypropyltrimethoxysilane was added. The solution was heated for 6.5 hours at 50° C., after which 447 g of the solution was transferred to a round-bottomed flask and stripped of a large portion of the volatiles using a rotary evaporator. Propylene glycol methyl ether acetate, 140 g, was added and stripping was continued at 55° C. and full vacuum. Stripping was stopped when the solution weight was 171 g, and 137 g of additional propylene glycol methyl ether acetate was added to the flask. Stripping was continued until the solution weight was 236 g. The solids content of the resulting titanium-containing nanoparticle dispersion was determined gravimetrically by stripping all of the volatiles off and was found to be 17.4 weight percent.

EXAMPLE 3

A mixture of 49.5 parts of an oligomeric polyester urethane diacrylate commercially available under the trade designation "CN-985B88" from Sartomer Co. and an amount of the product of Example 2 to provide 50 parts of titanium was vacuum stripped and 0.5 part of "Darocur 4265" (in the form of a 10% solution in 1-methoxy-2-propanol) was added. The resulting composition was spin coated from 1-methoxy-2-propanol on a bisphenol A polycarbonate plaque and cured by exposure to ultraviolet radiation emitted by a single "H" bulb. The resulting coating had a haze value of 0.43%, an abrasion rating of 25.7 and an adhesion rating of 0B. It is expected that adhesion could be improved by addition of minor proportions of a multifunctional (meth)acrylate monomer, as determined by simple experimentation.

EXAMPLES 4–10

Seven compositions, curable articles and cured articles were prepared in propylene glycol methyl ether acetate from the oligomer dimethacrylate of Example 1, the nanoparticle dispersion of Example 2, "Darocur 4265" (0.5%) as photoinitiator and, in Examples 5, 6, 8 and 10, hexanediol diacrylate ("HDDA").

The relevant parameters and the properties of the resulting compositions are given in the following table. For three samples, refractive indices were determined by ellipsometry at 589.878 nm and these results are also provided.

|  | Example | | | | | | |
| --- | --- | --- | --- | --- | --- | --- | --- |
|  | 4 | 5 | 6 | 7 | 8 | 9 | 10 |
| HDDA, % | 0 | 67.5 | 45 | 0 | 12.5 | 0 | 6.25 |
| Example 1, % | 90 | 22.5 | 45 | 50 | 37.5 | 25 | 18.75 |
| Example 2, % | 10 | 10 | 10 | 50 | 50 | 75 | 75 |
| Haze, % | 0.29 | 0.50 | 0.42 | 1.22 | 0.50 | 2.77 | 4.07 |
| Abrasion | 16.3 | 15.8 | 13.4 | 12.1 | 8.79 | 17.4 | 12.1 |
| Adhesion | 5B | 5B | 5B | 4B | 0B | 5B | 5B |
| Refractive index | — | 1.5297 | — | — | 1.6289 | 1.6929 | — |

It is apparent from the table that the cured articles of the invention have refractive indices close to the preferred range (particlularly in Example 9), haze ratings no greater than 5 and an abrasion rating within the desired range. With the exception of the article of Example 8, they also have suitable adhesion ratings. As with the article of Example 3, it is expected that the adhesion of the article of Example 8 could be improved by addition of minor proportions of a multifunctional (meth)acrylate monomer, as determined by simple experimentation.

While typical embodiments have been set forth for the purpose of illustration, the foregoing descriptions and examples should not be deemed to be a limitation on the scope of the invention. Accordingly, various modifications, adaptations, and alternatives may occur to one skilled in the art without departing from the spirit and scope of the present invention.

What is claimed is:

1. An optical article having a surface with a replicated microstructure comprising a plurality of utilitarian discontinuities having an optical purpose,
   said optical article comprising an organic resin having a haze rating corresponding to a value, as determined by ASTM procedure D1003 on a flat film 3.2 mm thick on a bisphenol A polycarbonate substrate, of up to 5% and said resin being prepared by curing a radiation curable composition comprising:
   (A) at least one oligomeric urethane multi(meth)acrylate, optionally in combination with at least one other monomer effective to reduce viscosity, improve thermomechanical properties or increase refractive index;
   (B) nanoparticles of at least one ethylenically unsaturated metal compound selected from the group consisting of tetravalent titanium and tetravalent zirconium compounds; and
   (C) at least one photoinitiator.
2. The article according to claim 1 wherein component B is a titanium compound.
3. The article according to claim 2 wherein component B is a (meth)acryloxyalkyltrialkoxysilane-functionalized compound.
4. The article according to claim 3 wherein component B is 3-methacryloxypropyltrimethoxysilane-functionalized.
5. The optical article according to claim 4 wherein said curing is carried out using ultraviolet radiation.
6. The article according to claim 2 wherein component A is a reaction product of 2,2,4-trimethylhexane 1,6-diisocyanate, polycaprolactone diol and 2-hydroxyethyl methacrylate.
7. The optical article according to claim 6 wherein said curing is carried out using ultraviolet radiation.
8. The article according to claim 2 wherein said other monomer is also present.
9. The article according to claim 8 wherein the other monomer is an acrylic monomer, styrenic monomer or ethylenically unsaturated nitrogen heterocycle.
10. The article according to claim 8 wherein the other monomer is a polyol multi(meth)acrylate.
11. The article according to claim 10 wherein said polyol (meth)acrylate is hexanediol diacrylate.
12. The optical article according to claim 11 wherein said curing is carried out using ultraviolet radiation.
13. The article according to claim 2 having a molar ratio of titanium to urethane multi(meth)acrylate compound in the range of about 5–10:1.
14. The optical article according to claim 13 wherein said curing is carried out using ultraviolet radiation.
15. The optical article according to claim 2 wherein said curing is carried out using ultraviolet radiation.
16. The article according to claim 1 wherein component A comprises about 30–100% by weight of oligomeric urethane multi(meth)acrylate, with any balance being said other monomer.
17. The article according to claim 1 wherein component B comprises about 5–90% by weight of total components A and B.
18. The optical article according to claim 17 wherein said curing is carried out using ultraviolet radiation.
19. The optical article according to claim 1 wherein said curing is carried out using ultraviolet radiation.
20. The optical article according to claim 19 having an abrasion rating, as determined by ASTM procedure D968, no greater than 20.
21. The optical article according to claim 20 having an abrasion rating no greater than 10.

22. An optical article having a surface with a replicated microstructure comprising a plurality of utilitarian discontinuities having an optical purpose, said optical article comprising an organic resin having a haze rating corresponding to a value, as determined by ASTM procedure D1003 on a flat film 3.2 mm thick on a bisphenol A polycarbonate substrate, of up to 5% and an abrasion rating, as determined by ASTM procedure D968, no greater than 20, and said resin being prepared by curing a radiation curable composition comprising:

(A) a reaction product of 2,2,4-trimethylhexane 1,6-diisocyanate, polycaprolactone diol and 2-hydroxyethyl methacrylate;

(B) nanoparticles of at least one 3-methacryloxy-propyltrimethoxysilane-functionalized titanium compound; and (C) at least one photoinitiator.

23. The optical article according to claim 22 wherein component A further comprises hexanediol diacrylate.

24. The optical article according to claim 23 wherein said curing is carried out using ultraviolet radiation.

25. The optical article according to claim 22 wherein said curing is carried out using ultraviolet radiation.

* * * * *